(12) United States Patent
Lin-Hendel

(10) Patent No.: US 7,899,719 B2
(45) Date of Patent: *Mar. 1, 2011

(54) SYSTEM AND METHOD FOR CONSTRUCTING AND DISPLAYING ACTIVE VIRTUAL REALITY CYBER MALLS, SHOW ROOMS, GALLERIES, STORES, MUSEUMS, AND OBJECTS WITHIN

(76) Inventor: Catherine Lin-Hendel, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/507,000

(22) Filed: Jul. 21, 2009

(65) Prior Publication Data

US 2010/0005009 A1 Jan. 7, 2010

Related U.S. Application Data

(63) Continuation of application No. 09/631,238, filed on Aug. 2, 2000, now Pat. No. 7,574,381.

(60) Provisional application No. 60/147,716, filed on Aug. 6, 1999.

(51) Int. Cl.
*G06F 17/30* (2006.01)
(52) U.S. Cl. ..................... 705/27.2; 705/26.1
(58) Field of Classification Search ........ 705/27.1–27.2, 705/26, 26.1–26.9
See application file for complete search history.

(56) References Cited

U.S. PATENT DOCUMENTS

| | | | |
|---|---|---|---|
| 5,196,838 A | 3/1993 | Meier et al. ................... 340/724 |
| 5,485,174 A | 1/1996 | Henshaw et al. ............. 345/123 |
| 5,621,430 A | 4/1997 | Bricklin ........................ 345/119 |
| 5,689,284 A | 11/1997 | Herget ........................... 345/145 |
| 5,749,082 A | 5/1998 | Sasaki ........................... 707/508 |
| 5,793,365 A | 8/1998 | Tang et al. .................... 345/329 |
| 5,835,896 A | 11/1998 | Fisher et al. .................... 705/37 |
| 5,848,399 A * | 12/1998 | Burke ............................. 705/27 |
| 5,874,936 A | 2/1999 | Berstis et al. ................. 345/123 |
| 5,877,761 A | 3/1999 | Shoji et al. .................... 345/341 |

(Continued)

OTHER PUBLICATIONS

Gavron et al., How to Use Microsoft Windows NT 4 Workstation, Ziff-Davis Press, pp. 105, 1996.
Kaiser J., Hot Picks, American Association for the Advancement of Science, Washington, Jan. 22, 1999, 1 page.
Spangard M., "Mona Lisa" Only a Click Away With Virtual Art Galleries, Greensboro News Record, Greensboro, NC, p. D6, Sep. 21, 1998.

(Continued)

*Primary Examiner* — Robert M. Pond
(74) *Attorney, Agent, or Firm* — Anatoly S. Weiser, Esq.; Acuity Law Group

(57) ABSTRACT

A system and method for virtually displaying on-line a gallery, a showroom, a store, a mall or any other room or space and the objects contained in said room or space, wherein the data displayed is comprised of a virtual reality data packet. The system displays still photographs of virtual reality shots and textual materials, and plays virtual reality video clips and audio stories about the room and/or the objects contained therein. Links are associated with each object so that detailed information in graphical, video, audio and/or textual forms that are related to the object and are stored external to the virtual reality data packet can be retrieved on demand from an external database for presentation to the viewer. The system also provides on-line controls that enable the viewer to move around the space, and a feature that enables a viewer to view an object from 360° around the object.

26 Claims, 23 Drawing Sheets

U.S. PATENT DOCUMENTS

| | | | | |
|---|---|---|---|---|
| 5,890,138 | A | 3/1999 | Godin et al. | 705/26 |
| 5,892,498 | A | 4/1999 | Marshall et al. | 345/123 |
| 5,905,973 | A | 5/1999 | Yonezawa et al. | 705/27 |
| 5,954,640 | A | 9/1999 | Szabo | 600/300 |
| 5,966,122 | A | 10/1999 | Itoh | 345/328 |
| 5,970,471 | A | 10/1999 | Hill | 705/26 |
| 5,974,398 | A | 10/1999 | Hanson et al. | 705/14 |
| 6,016,494 | A | 1/2000 | Isensee et al. | 707/102 |
| 6,026,376 | A | 2/2000 | Kenney | 705/27 |
| 6,026,377 | A | 2/2000 | Burke | 705/27 |
| 6,058,379 | A | 5/2000 | Odom et al. | 705/37 |
| 6,147,683 | A | 11/2000 | Martinez et al. | 345/341 |
| 6,167,382 | A | 12/2000 | Sparks et al. | 705/26 |
| 6,188,398 | B1 | 2/2001 | Collins-Rector et al. | 345/327 |
| 6,208,770 | B1 | 3/2001 | Gilman et al. | 382/305 |
| 6,211,874 | B1 | 4/2001 | Himmel et al. | 345/340 |
| 6,212,536 | B1 | 4/2001 | Klassen et al. | 707/513 |
| 6,215,490 | B1 | 4/2001 | Kaply | 345/340 |
| 6,222,541 | B1 | 4/2001 | Bates et al. | 345/341 |
| 6,249,773 | B1 | 6/2001 | Allard et al. | 705/26 |
| 6,264,104 | B1 | 7/2001 | Jenkins et al. | 235/383 |
| 6,300,947 | B1 | 10/2001 | Kanevsky | 345/333 |
| 6,313,854 | B1 | 11/2001 | Gibson | 345/788 |
| 6,321,991 | B1 | 11/2001 | Knowles | 235/472.01 |
| 6,330,575 | B1 | 12/2001 | Moore et al. | 707/513 |
| 6,334,145 | B1 | 12/2001 | Adams et al. | 709/217 |
| 6,345,764 | B1 | 2/2002 | Knowles | 235/472.01 |
| 6,360,205 | B1 | 3/2002 | Iyengar et al. | 705/5 |
| 6,363,419 | B1 | 3/2002 | Martin, Jr. et al. | 709/219 |
| 6,369,811 | B1 | 4/2002 | Graham et al. | 345/349 |
| 6,388,688 | B1 * | 5/2002 | Schileru-Key | 715/854 |
| 6,401,077 | B1 | 6/2002 | Godden et al. | 705/26 |
| 6,437,811 | B1 | 8/2002 | Battles et al. | 345/835 |
| 6,457,026 | B1 | 9/2002 | Graham et al. | 707/512 |
| 6,462,752 | B1 | 10/2002 | Ma et al. | 345/684 |
| 6,480,197 | B1 | 11/2002 | Bluthgen et al. | 345/467 |
| 6,513,035 | B1 | 1/2003 | Tanaka et al. | 707/3 |
| 6,538,698 | B1 | 3/2003 | Anderson | 348/333.05 |
| 6,580,441 | B2 | 6/2003 | Schileru-Key | 345/805 |
| 6,912,694 | B1 | 6/2005 | Harrison et al. | 715/784 |
| 6,940,488 | B1 | 9/2005 | Siddiqui et al. | 345/163 |
| 7,409,643 | B2 | 8/2008 | Daughtrey | 715/763 |
| 7,418,483 | B2 | 8/2008 | Hess et al. | 709/219 |
| 2003/0083957 | A1 | 5/2003 | Olefson | 705/27 |

OTHER PUBLICATIONS

Office Action; U.S. Appl. No. 09/544,036; Oct. 4, 2002.
Final Office Action; U.S. Appl. No. 09/544,036; Jun. 18, 2003.
Advisory Action; U.S. Appl. No. 09/544,036; Nov. 14, 2003.
Office Action; U.S. Appl. No. 09/544,036; Mar. 30, 2004.
Final Office Action; U.S. Appl. No. 09/544,036; Apr. 5, 2005.
Office Action; U.S. Appl. No. 09/544,036; Nov. 29, 2005.
Final Office Action; U.S. Appl. No. 09/544,036; Jun. 2, 2006.
Examiner's Answer; U.S. Appl. No. 09/544,036; apr. 2, 2007.
Decision on Appeal; U.S. Appl. No. 09/544,036; Nov. 19, 2008.
Office Action; U.S. Appl. No. 09/544,036; Mar. 18, 2009.
Office Action; U.S. Appl. No. 09/628,773; Jun. 18, 2003.
Office Action; U.S. Appl. No. 09/628,773; Feb. 4, 2004.
Final Office Action; U.S. Appl. No. 09/628,773; Aug. 10, 2004.
Office Action; U.S. Appl. No. 09/628,773; Jan. 23, 2007.
Office Action; U.S. Appl. No. 09/628,773; Aug. 10, 2007.
Office Action; U.S. Appl. No. 09/628,773; Jan. 25, 2008.
Notice of Allowance; U.S. Appl. No. 09/628,773; Aug. 5, 2008.
Notice of Allowance; U.S. Appl. No. 09/628,773; Jan. 26, 2009.
Office Action; U.S. Appl. No. 09/631,238; Sep. 5, 2002.
Office Action; U.S. Appl. No. 09/631,238; Mar. 23, 2007.
Final Office Action; U.S. Appl. No. 09/631,238; Oct. 12, 2007.
Office Action; U.S. Appl. No. 09/631,238; Jan. 29, 2008.
Final Office Action; U.S. Appl. No. 09/631,238; Jul. 28, 2008.
Notice of Allowance; U.S. Appl. No. 09/631,238; Apr. 3, 2009.
Office Action; U.S. Appl. No. 10/052,692; Aug. 25, 2004.
Final Office Action; U.S. Appl. No. 10/052,692; Mar. 3, 2005.
Examiner's Answer; U.S. Appl. No. 10/052,692; Sep. 28, 2005.
Decision on Appeal; U.S. Appl. No. 10/052,692; Aug. 31, 2006.
Office Action; U.S. Appl. No. 10/052,692; Dec. 7, 2006.
Final Office Action; U.S. Appl. No. 10/052,692; Jun. 20, 2007.
Notice of Allowance; U.S. Appl. No. 10/052,692; Sep. 14, 2007.
Office Action; U.S. Appl. No. 11/924,582; Jan. 12, 2009.

* cited by examiner

Prior Art
FIG. 1A1

AOL.COM  Search | Web Centers | Shopping | Community | Download AOL

You are here: Home > Shopping > Department Stores

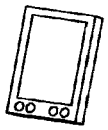

Deals & Steals $
Now Only $329.04
3Com Palm IIIX from firstssource.com
Special Offer!
Click Here To Buy Time to shape up for summer?!
Get in shape with new gear, check out these merchants for:
— excercise bikes and treadmills
— new work-out clothes

FEATURING

Netmarket Name Brands at Warehouse Prices

FEATURED STORES

*i*QVC
INTERACTIVE SHOPPING
iQVC for online shopping you can trust.

CyBer SHOP
Perfect year-round savings from CyberShop.

macys.com
Power Shopping 24/7/365
@macys.com

ESSENTIALS

Chic Simple

Summer Entertaining

Quick Gifts

JCPenny

*Spiegel*

*Service* MERCHANDISE

How to Shop
A-Z Store Listing
AOL Guarantee

MORE STORES

A HOT PICK
at 3.9% APR

Sports superstore

L.L.Bean

SHOP BY CATEGORY

- Apparel New!
- Auctions & Outlets New!
- Auto & Classifieds
- Beauty & Jewelry
- Books & Music
- Computing Products

- Department Stores
- Electronics & Video
- Flowers & Gifts
- Gifts & Collectibles
- Gourmet & Grocery
- Home, Kitchen & Garden

- Kids & Babies New!
- Office Products & Services
- Pets & Travel
- Sports & Outdoors New!

AOL.COM  Search | Web Centers | Shopping | Community | Download AOL 4.0

Copyright © America Online, Inc.
All rights reserved. Legal Notices
Try AOL
Privacy Policy

Prior Art
*FIG. 1A2*

AOL.COM   Search | Web Centers | Shopping | Community | Download AOL

---Choose a Category--- ▼   Customer Service   Our Gaurantee   ShopAOL.COM

Apparel

▶ Boys Teens'
▶ Girls Teens'
▶ Lingerie
▶ Men's
▶ Women's

FEATURED MERCHANT
eBags

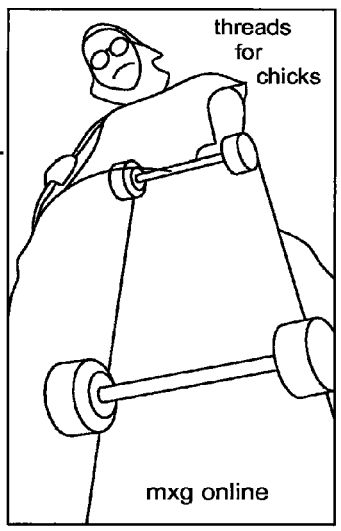

mxg online

Summer Wardrobe

Deals & Steals
Check out the great savings on everything for your wardrobe!

Pardon Our Dust
We're working to bring you a bigger and better shopping experience called Shop@AOL.COM. We will be bringing you more merchants, easier navigation, and a new shopping search. Come visit often to see our updates!

Moon Landing
Moon boots, space pens and a shuttle; celebrate the 30th Anniversary of the Moon Landing with these items and more.

Overstock Deals
Take advantage of Lands' End overstocks. Save up to 75% off!

Chic Simple
Renew your summer wardrobe with help from the experts.
Kids' Fitness
Keep your child active this summer.

Fashionable or Fashion victim?
Take the quiz to find out.

Specials
Take 25% off all intimates ar J. Crew!

Need help with time? Check out The Brain at Fossil!

INSTANT CREDIT and free AOL!

AOL prefers 

AOL.COM   Search | Web Centers | Shopping | Community | Download AOL 4.0

Copyright © America Online, Inc.
All rights reserved. Legal Notices
Try AOL
Privacy Policy

Prior Art
*FIG. 1B*

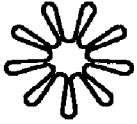
attEntION
dELiAs*cOm is an online store. If you're under 18 you'll need your parents' permission to order merchandise online.
If you're under 16 you'll also need your parents' permission to submit personal information on the site.
Get permission.
Then wear what you want.
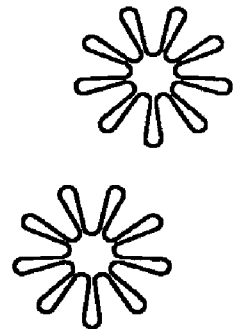
( cOnTinuE )
Prior Art
*FIG. 1C1*

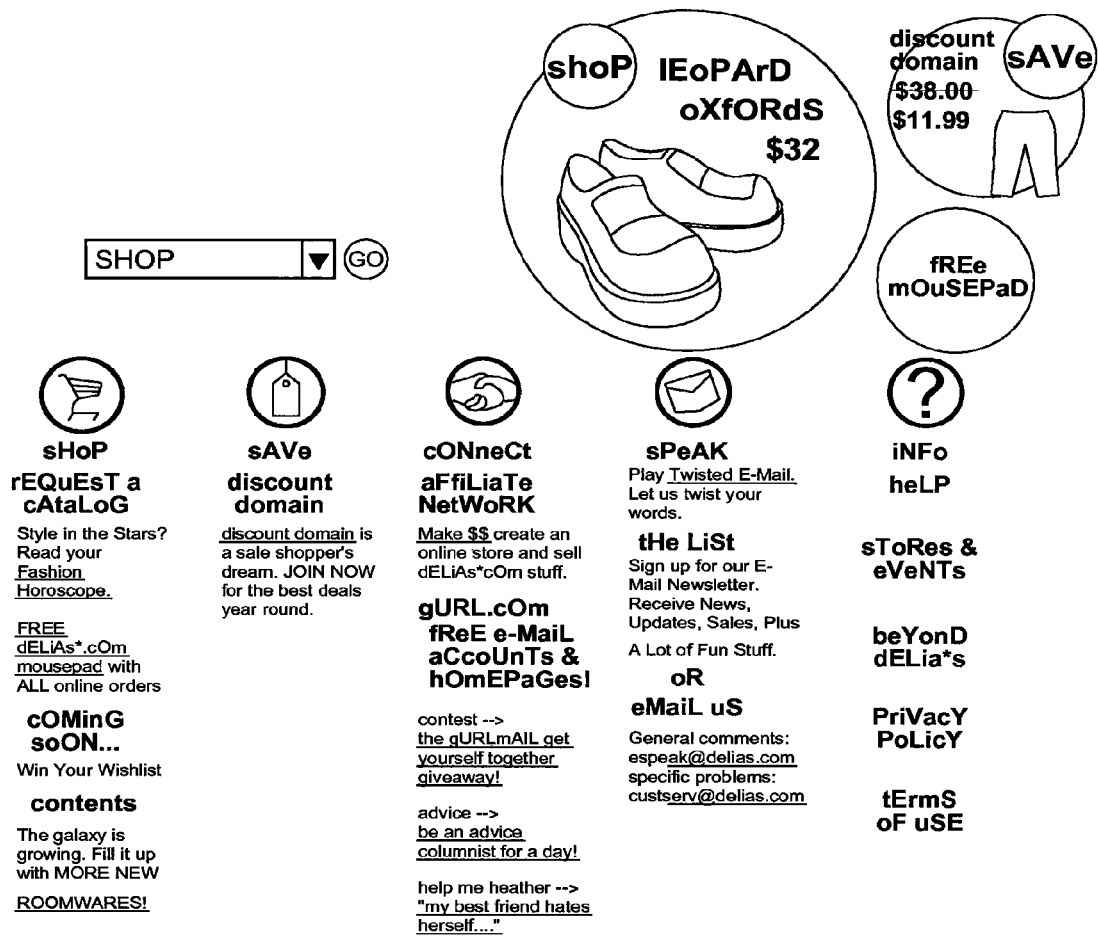
Prior Art
FIG. 1C2

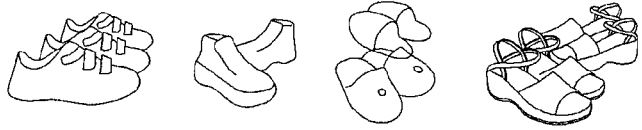
PRICE: $34.00
CARLA SHOES Satin platform wedge shoes with sequined stitching along covered platforms and toe straps. Ankle straps with metal buckle closures. Synthetic uppers and soles. By dELiA*s. Colors: black, light blue. Women's whole and half sizes: 5-9, 10, 11. 1" platforms, 3" heels. Imported.
sEleCt stYLe
Shoes
▶ Sneakers
▶ boots
▶ casual
▼ dressy
   Carla Shoes
Prior Art
*FIG. 1C3* artnet.com®   ART SEARCH ENGINE [ ] ▼ [search]

home | | artists | auctions | printshow | bookstore | magazine

MORE

IN ARTNET
MAGAZINE

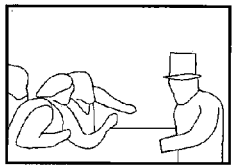

IN AUCTIONS:

*Arguing the Point*
*(detail)*
*Harry Roseland*
oil on canvas
22 x 28 in.
Est. 10,000-15,000 USD

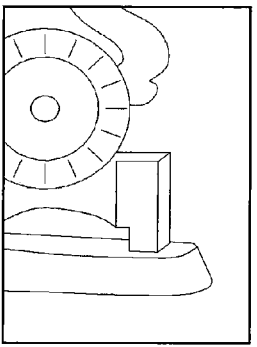

IN ANTIQUES:

Derek Roberts Fine
Antique Clocks,
Tonbridge, England
Two Train Skeleton
Clock Based on
Brighton Pavillion, c.
1860 (detail)

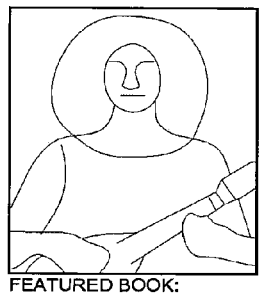

FEATURED BOOK:

*Pre-Raphaelite*
*Women Artists*
by Jan Marsh and
Pamela G. Nunn
Published to accompany an
exhibition in Manchester,
England, this catalogue brings
together paintings, drawings,
photographs, and other works
that women artists contributed
to the Pre-Raphaelite
movement.

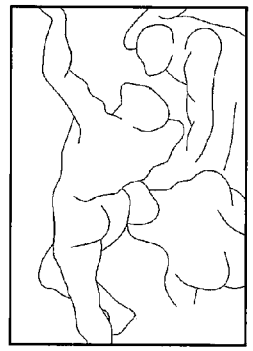

Peter Paul Rubens,
*Anatomical Studies: Three*
*Nudes, at Christie's*

OLD MASTER
REPORT
by Paul Jeromack
Summer sales in London, plus
Feigen finds Fra Angelico.

GO TO
AUCTIONS

FEATURED LOTS:

Ansel Adams
Winter Sunrise, The Sierra
Nevada...; 1944
Est. $7,500-9,000 USD

Arman
Waiting To Exhale; 1997
Est. $4,000-5,000 USD

Dennis Oppenheim
Search for Clues (Silver); 1976
Est. $300-400 USD

George Zimbel
Marilyn Monroe on the Set of
The...; 1954
Est. $700-1,000 USD

Margaret Jordan Patterson
The Swans; c. 1915
Est. $1,400-1,800 USD

Roy Lichtenstein
Reflections on Minerva; 1990
Est. $13,000-15,000 USD

Andre Kertesz
Puddle New York; 1967
Est. $1,500-2,000 USD

Keith Haring
The Golden Child; 1986
Est. $8,000-9,000 USD

NEW GALLERIES:

Artemis Fine Arts Inc., New York.
B & D Stidio Contemporanea, Milan.
Joan Barist Primitive Art, New York.
Bernabe Somoza Gallery, Houston
C.G. Boerner, Inc., New York
The Bradford Trust, Cape Cod
Brock Gallery, Action
Galerie Camille Burgi, Paris
Galleria Monica De Cardenas, Milan
Galerie Eric Coatalem, Paris
Gian Ferrari Arte
Contemporanea, Milan
Frank H. Hogan Fine Arts, Inc. Orleans
Indigo, Frankfurt
Mercury Gallery, Boston
Meyerovich Gallery, San Francisco
Miller Block Gallery, Boston
Muse [X] Editions, Los

NEW RELEASES:

David Hockney: Prints 1954-1995 The only available print catalogue raisonne, published in Japan.

Edward Ruscha: Editions 1962-1999 The much anticipated catalogue raisonne of the artist's print projects.

1999 Venice Biennale Catalogue The spectacular two-volume catalogue of the 48th Venice International Exhibition of Contemporary Art.

Jean-Michel Basquiat: Works on Paper The new catalogue raisonne from Galerie Enrico Navarra.

Art 20: The Thames and Hudson Multimedia Dictionary of Modern Art An invaluable

MY EYE
by Thomas Hoving
*Art for Dummies and "The*
*American Century."*

DESIGN'S HIP
ICONOCLAST
by Stanley
Abercrombie
The late Tibor Kalman at the
San Francisco MoMA

 Sponsored by Herman
Miller Furniture

GARRETT'S ATTIC
by Wendell Garrett

Prior Art
*FIG. 1D1*

Man Ray
Angers, 1930
Est. $6,000-8,000 USD

Mimmo Paladino
Untitled; 1985
Est. $25,000-30,000 USD

Donald Sultan
Untitled, July23, 1977
Est. $10,000-$12,000 USD

Jane Peterson
Mont St. Michel
Est. $5,000-7,000 USD

Edward Weston
Oceano, 1936; printed 1970's
Est. $2,000-3,000 USD

Karl Blossfeld
Untitled, Gravures from
Unformen...;c. 1929
Est. $300-400 USD

Berenice Abbott
Flatiron Building, New York;
1938, printed c. 1970's
Est. $3,500-4,500 USD Angeles.
Nike Fine Arts Gallery, New York.
Parkett Editions, New York
S.J. Phillips Ltd., London.
Maya Polsky Gallery, Chicago.
Derek Roberts Fine Antique Clocks, Tonbridge.
Leslie Sacks Fine Arts, Los Angeles.
Salomon Stodel Antiques, Amsterdam.
Saggarah Fine Arts, Monaco.
Christopher Selser, Santa Fe.
Galeria Tini Tapies, Barcelona.
Shoshana Wayne Gallery, Santa Monica.
Westland & Company, London.
XL Gallery, Moscow.

Are you selling art online...We are...click for testimonials.

and Macintosh.

Serge Poliakoff; Catalogue Raisonne of the Prints An exquisite production, edited by the artist's son Alexis.

Cezanne to Van Gogh; The Collection of Doctor Gachet The first comprehensive overview of the original collection, currently on view at the Metropolitan Museum of Art.

Lucio Fontana: Catalogue Rome A retrospective on the occasion or the artist's centenary celebration.

Chagall: Lithographs A new catalogue raisonne.

Sea Change: The Seascape in Contemporary Photography Now on view at the International Center of Photography, New York.

room chairs for the William H. Vanderbilt Mansion in New York City.

Sponsored by

| GEORG | THE SILVER |
| JENSEN | FUND LIMITED |

The world's leading specialists in Georg Jenson silver

SIGN UP ▶ yourname@artnet.com
LOGIN ▶ FREE EMAIL FROM ARTNET.COM ✉

SUBSCRIBE TO THE artnet.com
email auction alert site map member services resources dialogue about us add a site to the art search engine ©1999 artnet.com. All rights reserved. Artnet.com is a registered trademark of the ArtNet Worldwide Corporation, New York, NY.
Terms and Conditions

Prior Art

*FIG. 1D2* home | my ebay | site map

Browse | Sell | Services | Search | Help | Community your personal trading community™

Search tips categories

Antiques (61393)
Books, Movies, Music (351659)
Coins & Stamps (95869)
Collectibles (798476)
Computers (89104)
Dolls, Figures (49520)
Jewelry, Gemstones (99174)
Photo & Electronics (45723)
Pottery & Glass (153961)
Sports Memorabilia (316791)
Toys & Beanies Plush (259967)
Miscellaneous (230983)
*all categories...*

Sell your item new users Click here

Get news and chat

Register It's free and fun featurEd
1500 Old Uncirculated Silver Half Dollars !!
Mcse Certification Training 12-Cd $599 Value!
The Greatest CAL RIPKIN, JR. Collectible ever
Titanic - Capt. Smith & Band(3 Photo Posters)
<<austin Powers Talking Head Music>Yeah, Baby
Build And Repair Computers!! PC Tech Cd!!
(more!) see more featured....

*Seeing is believing...try the* gallery *click here* welcoMe
What is eBay?
How do I bid?
How do I sell?
Register, it's free!

statS
2,555,696 items for sale in 1,627 categories now!
Over 1.5 billion page views per month!

fun sTuff
Subscribe now!
Get your charter subscription to eBay magazine cool feaTures
L.A. looking for a surfboard, flashy red convertible, or filmaking gear? Visit eBay LA, our first regional eBay.

*cool happenings...*

Announcements | Register | eBay Store | SafeHarbor | Feedback Forum | About eBay | Jobs
Get Local - eBay LA | Go Global! | Canada | UK | Germany | 日本田のヘルプ

Last updated: 08/05/99, 16:15:00PDT

AOL ALL NEW
Click Here! 4.0

 PRIORITY MAIL

My eBay | Site Map
Browse | Sell | Services | Search | Help | Community

BBB
A better Business Bureau Program
BBB Online
CLICK TO CHECK

Copyright© 1995-1999 eBay Inc. *All Rights Reserved.*
Use of this Web site constitutes acceptance of the eBay User Agreement.

Prior Art
*FIG. 1E1*

Prior Art
*FIG. 1E2*

Prior Art

*FIG. 1E3*

Prior Art

*FIG. 1E4*

| All Items in Furniture |||||
|---|---|---|---|---|
| Current Auctions |||||
| For more items in this category, click these pages: <br> = 1 = 2 3 4 5 6 ... 20 ... 36 (next page) |||||

| Item | Price | Bids | Ends PDT |
|---|---:|:---:|---|
| MAGNIFICENT EGYPTIAN DINING ENSEMBLE | $5000.00 | - | 07/26 16:55 |
| Majorelle Armoire' | $8000.00 | - | 07/26 16:51 |
| Old Brass Ornamental Griffin Fireplace Fan | $9.99 | - | 07/23 16:51 |
| OLD HAND CRAFTED DOLL'S WARDROBE!! | $25.00 | - | 07/23 16:43 |
| MASSIVE CLAWFOOT OAK LAMP TABLE | $385.00 | - | 07/23 16:42 |
| OLD HEREKE PERSIAN Oriental Rug NiceRugs | $400.00 | - | 07/26 16:30 |
| An Encyclopedia of Desks By Mark Bridge 1988 | $9.50 | - | 07/23 16:29 |
| VICTORIAN EBONIZED/GILT INCISED SEWING BENCH | $29.99 | - | 07/21 16:29 |
| Furniture Refinishing: The Furniture Doctor | $5.00 | - | 07/23 15:58 |
| Mahogany Round Tea Table | $140.00 | - | 07/23 15:41 |
| French Style Desk | $290.00 | - | 07/26 15:32 |
| Armoire | $1500.00 | - | 07/26 15:30 |
| 1860's MAHOGANY CHEST OF DRAWS | $100.00 | - | 07/23 15:29 |
| *19thC. MAHOGANY FLAMBE 1 DRAWER STAND/TABLE* | $49.99 | - | 07/21 15:26 |
| Duncan Phyfe Pair of Lyre Mahogany Drum Table | $295.00 | - | 07/23 15:24 |
| Louis XVI Mahogany Bedroom Suit Antique | $595.00 | - | 07/23 15:10 |
| Officer's Folding Canopied Bed 1850's NICE | $250.00 | - | 07/26 15:08 |
| Glass Floor Protectors for Furniture | $3.00 | - | 07/23 15:03 |
| Antique Oak Office Chair | $25.00 | - | 07/26 15:02 |
| Old Old victorian Stand with engravings NEAT | $20.00 | - | 07/19 14:58 |
| Duncan Phyfe Mahogany Antique Sofa | $295.00 | - | 07/23 14:56 |
| STUNNING FRENCH ARMOIRE | $99.99 | - | 07/23 14:52 |
| Duncan Phyfe Mahogany Living Room Suit | $295.00 | - | 07/23 14:48 |
| Oak Rolltop Desk | $900.00 | - | 07/26 14:47 |
| * Leather Couches * tan double pillow | $100.00 | - | 07/26 14:47 |
| Duncan Phyfe Mahogany Dining Table Antique | $100.00 | - | 07/23 14:36 |
| Duncan Phyfe Mahogany Barrel Chair Antique | $75.00 | - | 07/23 14:33 | http://listings.ebay.com/aw/listings/hst/category1209/index.html     7/16/99

Prior Art

*FIG. 1E5*

Virtual Tour

| Exterior Front |
| Kitchen/Dining Room |
| Dining Room/Family Room |
| Master Bedroom |

Master Bedroom

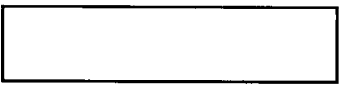

Virtual Tour

© 1999 bamboo.com, Inc. All rights Reserved
Loading panoramic image. This may take a moment...

If you cannot view the Full Featured Virtual Tour, click here to see the Basic Version, or click here for help.

To learn about advanced viewing features such as zoom click here

Prior Art
*FIG. 2A*

The Portal to Good Living

- Shopping
- Auctions, Sales
- Build to Order
- Personal Concierge

- Registration
- My Folder
- Listings
- search

Bon Vivre

- Communications Concierge
- Executive Web Concierge

- Articles, Magazines
- News, Events
- Chat, Forum
- Bulletin Board
- RFP, RFQ onVivre.com |

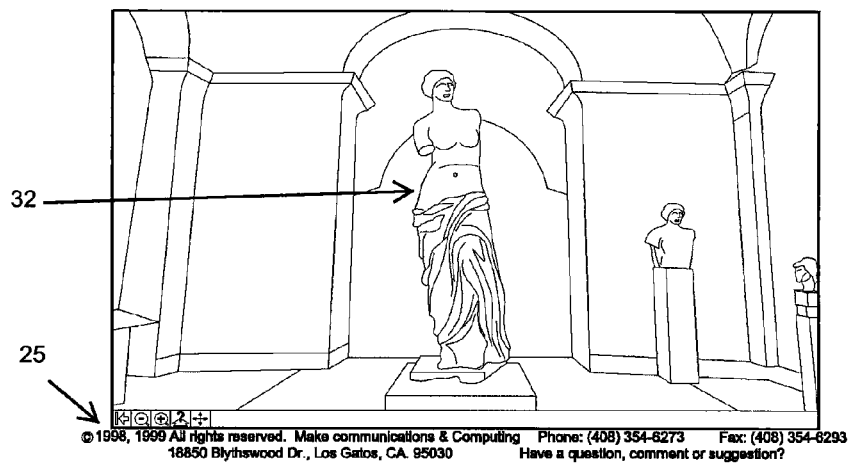

© 1998, 1999 All rights reserved. Make communications & Computing    Phone: (408) 354-6273    Fax: (408) 354-8293
18850 Blythswood Dr., Los Gatos, CA. 95030    Have a question, comment or suggestion?

*FIG. 3A*

The Portal to Good Living

- Shopping
- Auctions, Sales
- Build to Order
- Personal Concierge

- Registration
- My Folder
- Listings
- search

Bon Vivre

- Communications Concierge
- Executive Web Concierge

- Articles, Magazines
- News, Events
- Chat, Forum
- Bulletin Board
- RFP, RFQ onVivre.com | 70

32A

Virtual Reality

Venus of Milo

Ancient status of Aphrodite, now in Paris at the Louvre; carved by a sculptor of Antioch on the Maeander River in 150 BC, it was found on Melos in 1820. The general composition derives from 4th-century Corinthian status. The action and modernized drapery give the Venus great nobility. The status is a conspicuous example of the Hellenistic sculptural tradition's academic traits and close reliance on older masterpieces.

34

| Replica | 3 ft | 5 ft | 6 ft |
|---|---|---|---|
| Indoor/Outdoor Rasin Price | $500 | $1,000 | $1,500 |

© 1998, 1999 All rights reserved. Make communications & Computing   Phone: (408) 354-6273   Fax: (408) 354-6293
18850 Blythswood Dr., Los Gatos, CA. 95030   Have a question, comment or suggestion?

*FIG. 3D*

The Portal to Good Living

- Shopping
- Auctions, Sales
- Build to Order
- Personal Concierge

- Registration
- My Folder
- Listings
- search

Bon Vivre

- Communications Concierge
- Executive Web Concierge

- Articles, Magazines
- News, Events
- Chat, Forum
- Bulletin Board
- RFP, RFQ onVivre.com |

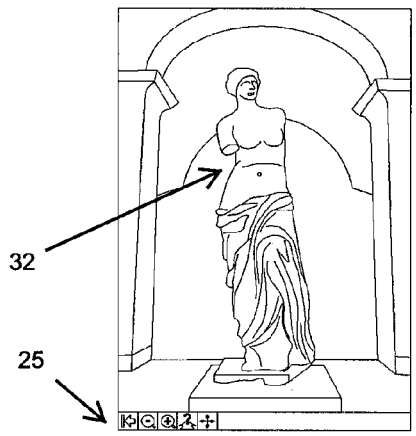

32

25

© 1998, 1999 All rights reserved. Make communications & Computing   Phone: (408) 354-6273   Fax: (408) 354-6293
18850 Blythswood Dr., Los Gatos, CA. 95030   Have a question, comment or suggestion?

*FIG. 3E*

SYSTEM AND METHOD FOR CONSTRUCTING AND DISPLAYING ACTIVE VIRTUAL REALITY CYBER MALLS, SHOW ROOMS, GALLERIES, STORES, MUSEUMS, AND OBJECTS WITHIN

PRIORITY NOTICE

This Non-Provisional U.S. Patent Application is a continuation application of U.S. patent application Ser. No. 09/631,238, filed Aug. 2, 2000 now U.S. Pat. No. 7,574,381, which claims U.S. Provisional Application No. 60/147,716, filed Aug. 6, 1999, which are incorporated herein by reference in their entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

The present invention is related to constructing panoramic, virtual-reality Cyber/Electronic (Cyber) show-rooms, galleries, stores, or malls (show-rooms) in electronic media, displaying such cyber shown-rooms on-line on remote terminals or client/user computers, allowing the viewers at the computer terminals or client/user-computers to select objects displayed in the cyber virtual-reality show-rooms on-line, and retrieve and review remote data related to the selected objects.

DESCRIPTION OF RELATED ART

In the brick-and-mortar world, showrooms, galleries, and stores are used to display furnishing, interior accessories, fashion, art, antiques, or other objects. Shopping centers, malls, and main streets are constructed to aggregate a large number of stores. The on-line equivalent of such commerce components are constructed with database containing information for such objects or stores sorted with nesting categories. The objects in conventional cyber stores, galleries, and show rooms are represented on the client/user computer screens as index lists of textual or thumbnail entries. The stores in a conventional cybermall are represented by a collection of "banner" entries (see FIGS. 1A1, 1A2, 1B, 1C1, 1C2, 1C3, 1D1, 1D2, 1E1, 1E2, 1E3, 1E4, 1E5, 1F). Thumbnails are small graphical representation of an object, serving as an index and a link to detailed information regarding the object. Banner is a small graphical box-like icon with the logo and name of a business entity on the Web Clicking on a thumbnail usually brings an enlarged photograph and/or descriptions of the object from the server database to the client/user's computer screen. Clicking on a "banner" brings the user to the home page of the business entity the banner represents.

A typical on-line gallery or store, for example, would show category titles of the gallery collections or store items, with some textual entries or graphical thumbnails of selected "featured" exhibits or items. When a particular "last stop" category on a particular categorical path is clicked, the items or objects sorted under that category are presented in an index list of textual one-line entries or thumbnail entries. The index list could be very long, and partitioned into many web pages (each may be several print pages long), accessible one-web page-at-a-time. Clicking on a textual or thumbnail entry or brings detailed textual description and an enlarged version of the thumbnail, if available, again, only one-at-a-time (see FIGS. 1A1 and 1A2).

Virtual Reality software, such as Apple Computing Quick Time, or Macromedia Flash, on the other hand, has been developed to show scrolling panoramic views of a room or a scene, or to rotate a three-dimensional object to show its 360-degree views. The Virtual Reality source data is typically prepared by shooting multiple still photographs of a room, a scene, or an object from sequentially varying angles, and re-compose the still photographs in the correct spatial-time sequence to form a contiguous panoramic view. Video filming can also be used. Viewing the Virtual Reality image at the viewer's computer screen is controlled by the "mouse," a computer input device (see FIGS. 2A, 2B, and 2C) and the control buttons on the VR "viewing window" on the computer screen. The panoramic view of a scene is scrolled across the viewing window. The still shots from sequentially varying angles of a 3-D object is "flashed" onto the VR viewing window, producing an illusion of the object rotating in the window, given a large enough number of still shots, and fast enough speed of spatial-time re-composition or "flashing."

Virtual Reality has not been used in actionable on-line or electronic commerce environment, except for viewing purposes only, such as displaying a property or a house on-line on Real-Estate listing sites as in FIGS. 2A, 2B, and 2C; or, rotating a 3-D object, such as a car on car sites; or, for other purely entertainment purposes, such as displaying the content of a museum. In all cases, the Virtual Reality graphical data packet is treated as a single data entity with a single "packet address," accessed by clicking a VR or 3D button, and viewed by controlling the temporal scanning or rotation using the control buttons on the computer screen in conjunction with the button on the input device, the mouse. From within the Virtual Reality data packet, there is no link to the external world outside the data packet. Therefore, there is no practical application other than its visual and entertainment value. One cannot do anything with the Virtual Reality presentation of the known-art, other than looking at it and enjoying it.

SUMMARY OF THE INVENTION

The present invention relates to methods and apparatus to construct and display electronic/cyber/on-line showrooms, galleries, stores and malls to emulate the physical brick and mortar world, in additional to the conventional category and index listing e-commerce construct of the Web. Virtual Reality (VR) shots and/or Video films are made to visually present a show room, gallery, store, or object with more resemblance to the physical world we live. Each still picture of the VR shots or each frame of the video film is given a unique frame address. Each significant and unique object in the VR data packet is given a unique identification, indexed and addressed by the area the object occupies in a picture or a frame. Links are associated with each such object, such that detailed information (such as graphical, video, audio, or textual descriptions) related to the objects stored external to the VR data packet, can be retrieved from the database on demand, when the objects in the VR images are "selected"/"clicked."

BRIEF DESCRIPTION OF THE DRAWINGS

Figure 1E3:
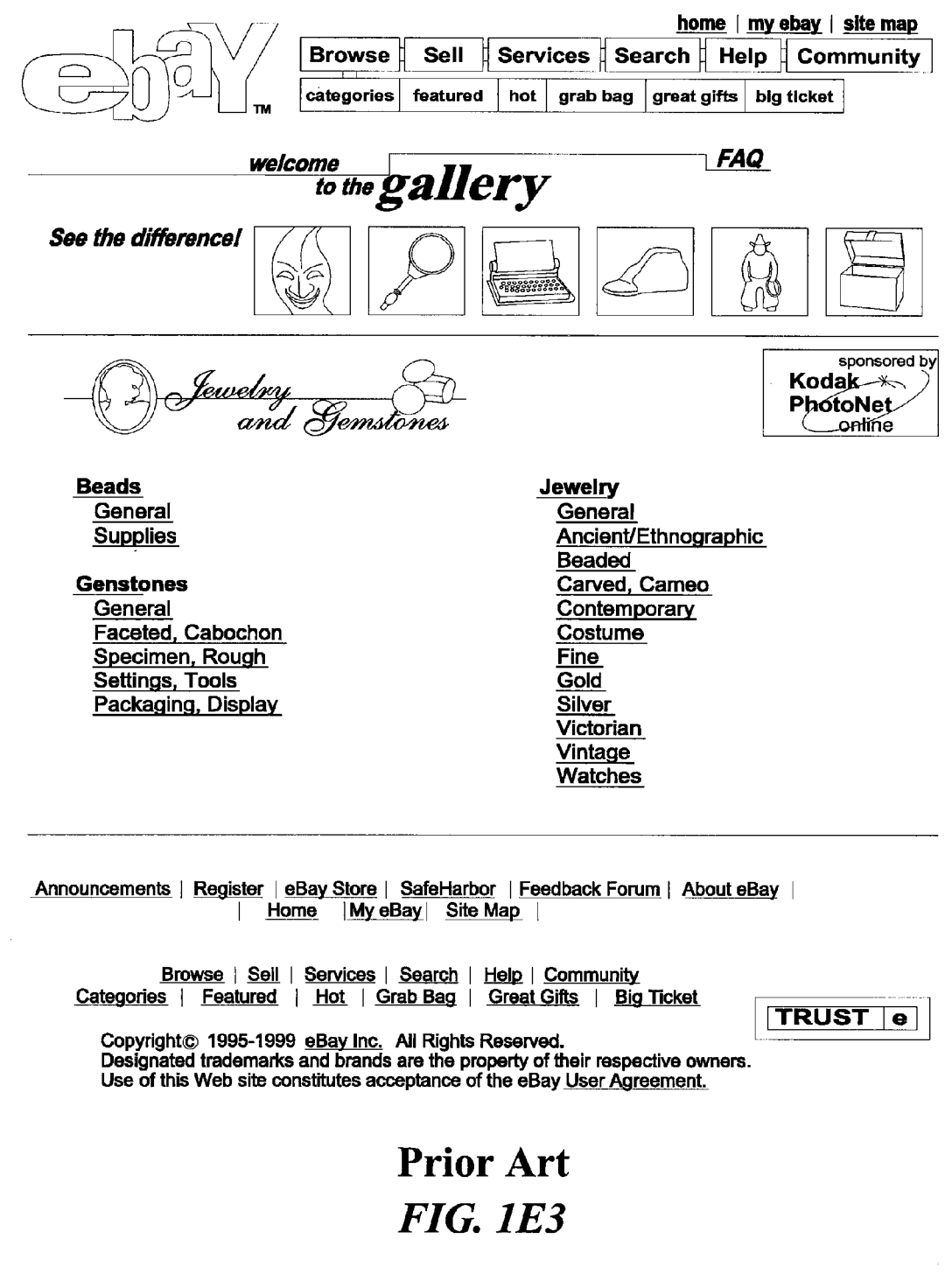
Figure 1E4:
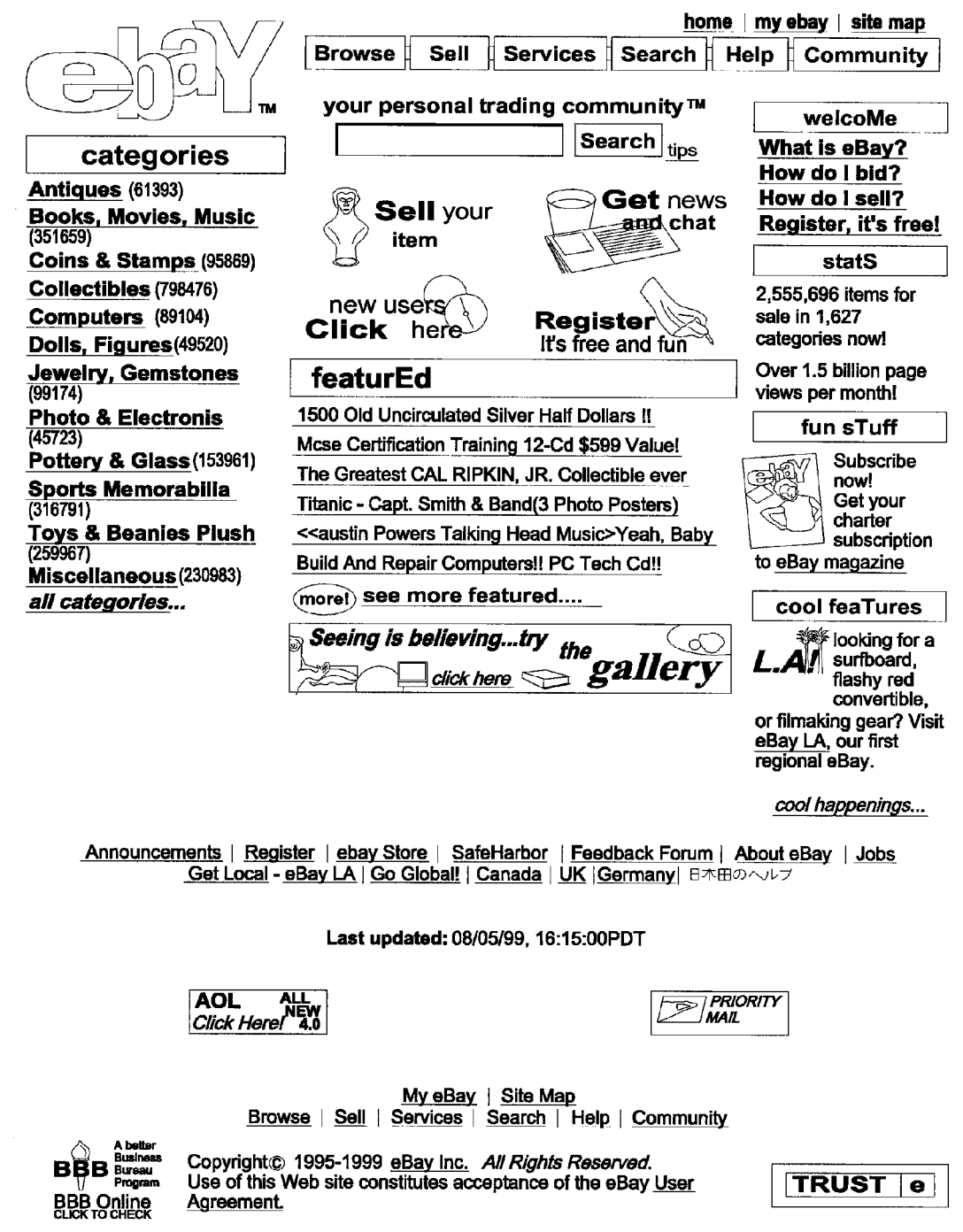

FIG. 1A1 illustrates prior art on-line malls, stores, galleries, and showrooms.

FIG. 1A2 illustrates a prior art AOL Mall having a collection of department stores represented by banners. Other types of stores are sorted under categories, and accessed through the category listing at the bottom of the page.

FIG. 1B illustrates a prior art AOL Apparel Store's listing.

FIGS. 1C1, 1C2 and 1C3 illustrate a prior art dEliAs.Com store listed under the AOL Apparel Stores.

FIGS. 1D1 and 1D2 illustrate prior art Artnet.Com Galleries.

FIG. 1E1 illustrates a prior art Ebay home page.

FIGS. 1E2 through 1E4 illustrate prior art Ebay Galleries.

FIG. 1E5 illustrates a prior art first print page of the first web-page of a 36 web-page Ebay Furniture listing

FIGS. 2A, 2B and 2C illustrate prior art Virtual Reality: Virtual touring of a home displayed on the www.bamboo.com web site. There is no other function beyond the visual tour: scrolling the panoramic image to the left, to the right, and look at it.

FIG. 3A illustrates a central scene and the primary object of a Virtual Reality presentation of a museum hall with small buttons at the lower left corner to scroll the panoramic scene of the Hall to the left, right, up, down, and zoom-in, and pan-out.

FIG. 3D illustrates an example of data stored in memory space external to the Virtual Reality data packet, linked to the object image from within the Virtual Reality data packet.

FIG. 3E illustrates the object with control buttons at the lower left corner resulting from activation of the "Virtual Reality" button in FIG. 3D in accordance with the present invention.

DETAILED DESCRIPTION OF THE EMBODIMENT OF THE INVENTION

Figure 1F:
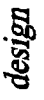
FIG. 1F illustrates a prior art Design Toscano Cyber Show Room.
Figure 2B:
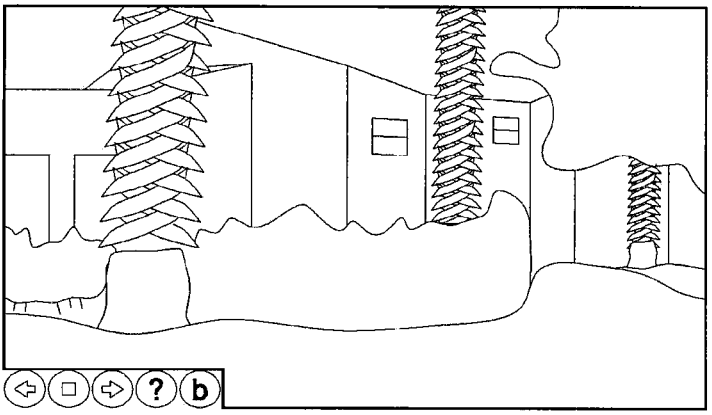

Referring again to prior art FIG. 2A, clicking on the "Exterior Front" selection on the menu at the left side, initiates the downloading of the "panoramic image of the exterior front view of the house from the server database, as noted under the "Bamboo.com/Virtual Tour" logo at the center of the page.

Referring again to prior art FIG. 2B, when the downloading of the panoramic image is complete, the exterior scene of the home scrolls across the "VR window" on the computer screen. The buttons on the lower left corner of the VR window are control buttons activated by the computer mouse. By moving the cursor to the "left" arrow, and pressing down on the left mouse button, the image scrolls to the left, bringing the portion of the panoramic image beyond the right margin of the window into view. Pressing on the left button of the mouse while the cursor is resting at the "right" arrow, scrolls the image to the right. The "square" button stops the scrolling, and the "b" button is for clicking "back" to the previous page, which is the home page.

Figure 2C:
Figure 2C:
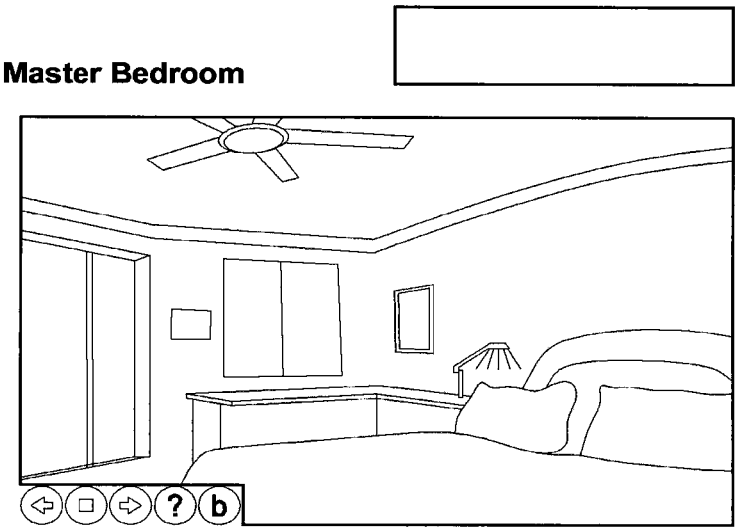
Figure 2C:

Referring now to prior art FIG. 2C, clicking on the "Master Bedroom" selection on the menu at the left side of the page, causes the "panoramic" image of the master bedroom, to download from the site-server to the client/user's computer screen. The scrolling and stopping functions are identical to those in FIG. 2B.

The present invention relates to methods and apparatus to construct and display electronic/cyber/on-line showrooms, galleries, stores and malls to emulate the physical showrooms, galleries, stores, and malls. Virtual Reality (VR) shots with audio segments, and/or Video films are made to visually, audibly, and contiguously present a show room, gallery, store, or object. Each still picture 32A of the VR shots or each frame 30a, 30b, 30c, 30d, 30e, 30f, 30g, 30h, and 30i of the video film is given a unique frame address within the VR packet address. Thus, each picture 32A or each frame 30a, 30b, 30c, 30d, 30e, 30f, 30g, 30h, and 30i is identifiable via the address of the packet and the address of the frame 30a, 30b, 30c, 30d, 30e, 30f, 30g, 30h, and 30i. Each significant and unique object 32 in the VR data packet, is given an unique identification, indexed by the area 50 the unique object 32 occupies in the frames 30a, 30b, 30c, 30d, 30e, 30f, 30g, 30h, and 30i or pictures 32A containing the object. Links are assigned to that unique object 32, which may appear in multiple frames, such that detailed information (such as graphical, VR, video, audio, or textual descriptions) related to the object 32 addressed by the links, can be retrieved from the database external to the VR data packet, on demand, such as when the object 32 in the proximity frames is "clicked," from any of the proximity frames.

Clicking on a particular object 32 in a frame 30a, 30b, 30c, 30d, 30e, 30f, 30g, 30h, and 30i, or in any of the proximity frames 30b, 30c, 30d, 30e, 30f, 30g, and 30h in a VR presentation of a show room, gallery, or store, would select the link/links associated with the particular object 32 clicked, and store the links in a file on the client/user computer. Multiple objects can be "clicked,"—i.e., selected, within a VR presentation. When the viewing and the selection process is completed, and the collection of "clicked" links is submitted to the server, by clicking a "submit" button, all data, whether video, audio, VR, graphics, or textual, addressed by the links submitted are brought from the server database to the client/user/user computer with reference to each selected object.

Figure 3B:
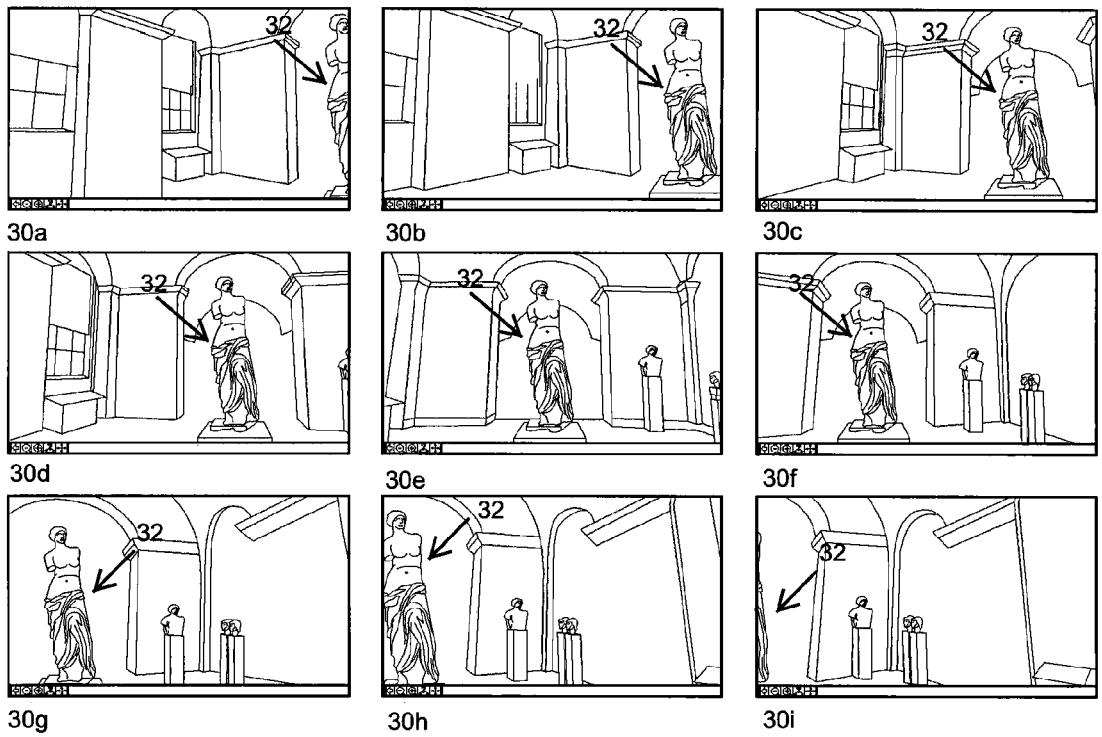
FIG. 3B illustrates nine Virtual Reality frames around the central object in the hall, scanning from the left of the object through the object, to the right of the object, each assigned its unique frame identity in the present invention.

FIG. 3A shows the central scene about a primary object 32, Venus of Milo of a Virtual Reality presentation of a museum hall. The small buttons 25 at the lower left corner scrolls the panoramic scene of the Hall to the left, right, up, down, and zoom-in and pan-out. A selected set of nine frames 30a, 30b, 30c, 30d, 30e, 30f, 30g, 30h, and 30i around the primary object 32 in this example, are shown in FIG. 3B. The limit of the conventional Virtual Reality of the known-art is here. There is no interaction or linking mechanism from inside the Virtual Reality images, such as these frames, to data outside of the VR packet. In FIG. 3B, there are nine Virtual Reality frames 30a, 30b, 30c, 30d, 30e, 30f, 30g, 30h, and 30i around the primary object 32 in the hall, scanning from the left of the object through the object, to the right of the object, each assigned its unique frame identity in the present invention.

In our implementation, each frame 30a, 30b, 30c, 30d, 30e, 30f, 30g, 30h, and 30i in the Virtual Reality data packet is given an identification. A primary object 32 that appears in multiple proximity frames would be "cut out" from the rest of each frame, or the scene, and given a unique identification, and assigned a link, or a collection of links, to link to external data storage space that stores data associated with the object 32. The primary object 32 appearing on several proximity frames, such as from FIG. 3B—frame 30b through frame 30h, would be identified as one object, and given the same set of links.

Figure 3C:
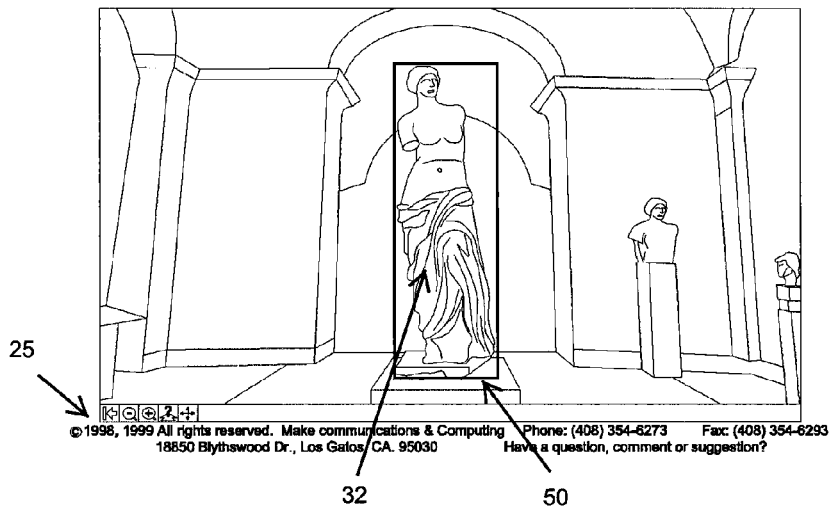
FIG. 3C illustrates a rectangular area closely surrounding the object that is cut, and marked out and identified separately from the rest of the picture/frame in accordance with the present invention.

A rectangular area 50 closely surrounding the object 32 in all of the proximity frames is cut as shown in FIG. 3C, and marked out and separated from the rest of the frame in order to be assigned a separate and unique identity to the object 32. This is done for frame 30b through frame 30h in FIG. 3B. The rectangular area 50 in all 7 frames 30b, 30c, 30d, 30e, 30f, 30g and 30h are assigned the same identity representing the object 32, and the same links to the memory space external to the Virtual Reality Frames, containing the detailed information related to the object 32. Clicking within the rectangular area 50 in all 7 frames 30b, 30c, 30d, 30e, 30f, 30g and 30h results in linking to the same set of data.

FIG. 3D shows frames, video, or VR can all be linked and called on demand. In this example, the enlarged still image 32A in FIG. 3D is further linked to another virtual Reality data packet that presents the object in 360-degree rotation.

Figure 3F:
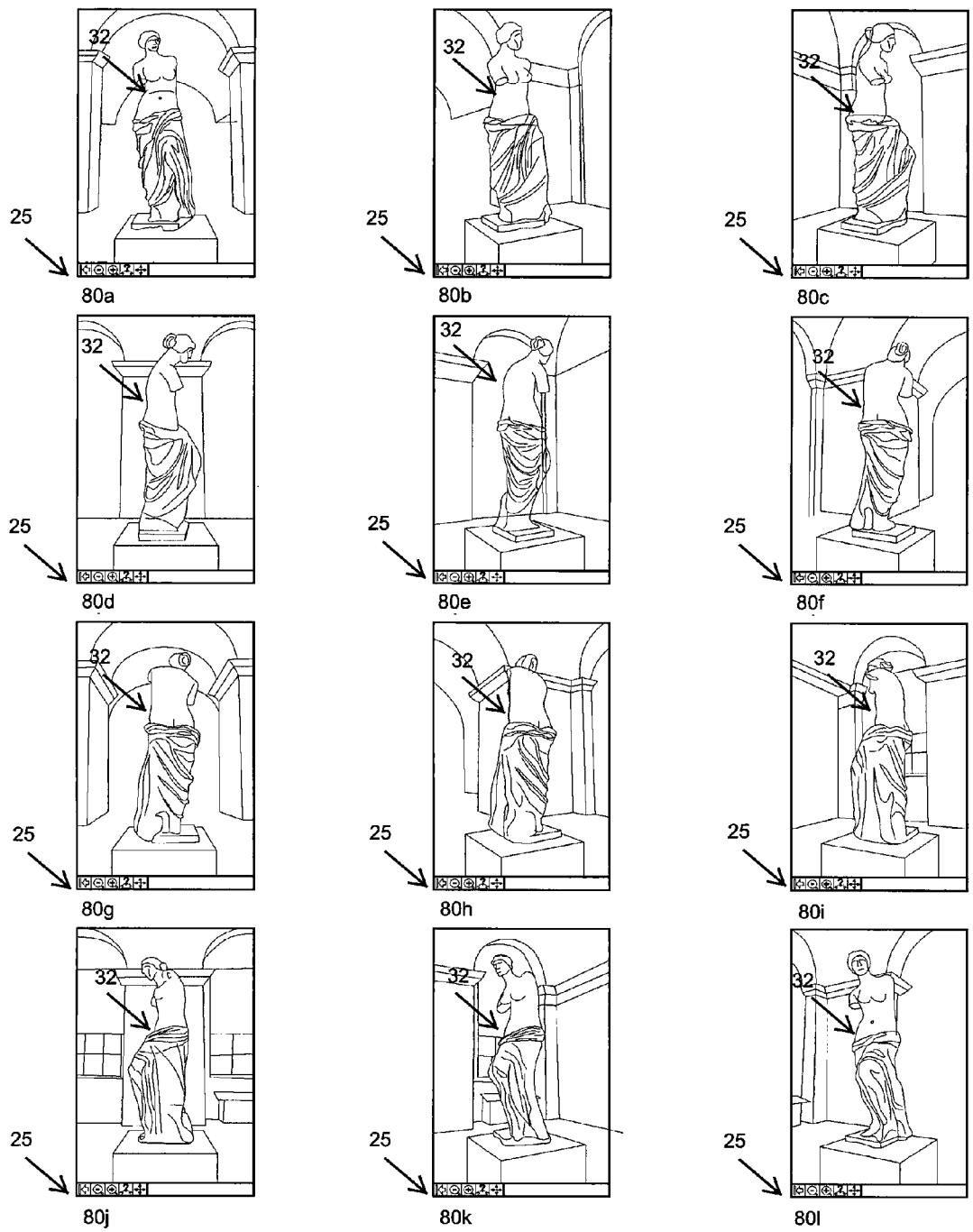
FIG. 3F illustrates 12 of the standard 36 frames shot from equally spaced angles 360-degrees around the object in accordance with the present invention.

Referring now to FIG. 3E, clicking the "Virtual Reality" button 70 in FIG. 3D, brings the "rotating" Virtual Reality data packet of the object, with the control buttons 25 at the lower left corner. FIG. 3F shows the 12 of the standard 36 frames 80a, 80b, 80c, 80d, 80e, 80f, 80g, 80h, 80i, 80j, 80k and 80l shot from equally spaced angles, 360-degrees around the object. When the number of shots and the speed of sequentially "flashing in" the still images into the viewing window are compatible, human eyes perceive that the object rotates on the viewing window. A larger number of shots would permit a smoother and slower rotation.

The invention enables practical and actionable commerce applications of Virtual Reality and Video casting or streaming technologies on the web, for example, in displaying objects in show rooms, galleries, stores, or stores in malls, shopping centers, or on main streets in a "real life" format, in addition to the conventional categorization, search, and listing presentations in the conventional web stores and galleries. The current invention enables object images to be linked to additional textual, audio, graphical, video, or VR data stored in the database outside of the Virtual Reality or Video data packet. Clicking on the image of a sofa in such an "active Virtual Reality" show room of this invention for example, of an interior furnishing show room, would deposit the links associated with the image to a temporary file. When the entire VR or Video presentation is viewed, and the selection of multiple interested objects shown in the VR presentation is completed, the collection of links of the objects selected is submitted to the server from the client/user computer, to retrieve data addressed by the submitted links, including but not limited to detailed audio or textual descriptions, additional graphics or VR presentations, pricing information and ordering/or buying submission mechanism, sorted and presented by each object at command.

The present invention is implemented using software which can be written in many programming languages, or implemented with many web-page generation tools. The present invention can be used on a global or local computer network, on a personal computer, on viewable storage media such as a CD ROM, on a wireless telephone, on a wireless personal assistant such as a Palm Pilot®, or on any type of wired or wireless device that enables digitally stored information to be viewed on a display device. Also, information displayed and viewed using the present invention can be printed, stored to other storage medium, and electronically mailed to third parties.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A computer-implemented method, comprising:
   displaying a virtual reality scene corresponding to a physical scene including a plurality of first objects, wherein the virtual reality scene is built from a plurality of images representing different views of the physical scene;
   enabling a user to navigate within the virtual reality scene and observe the virtual reality scene from one or more perspectives of the different views;
   displaying a selectable object within the virtual reality scene, one object of the plurality of first objects corresponding to the selectable object wherein the selectable object is built from a plurality of images of the one object taken from different respective angles;
   in response to receiving a first selection of the selectable object, displaying the one object in a rotational view window, and enabling the user to observe the one object from a plurality of angles;
   after receiving a second selection of the selectable object within the rotational view window, displaying a link to an actionable commerce application comprising a submission mechanism that allows the user to at least one of order and buy at least the one object of the plurality of first objects.

2. The computer-implemented method of claim 1, wherein the physical scene corresponds to one of: a show-room, a gallery, a store, a mall, and an auction site.

3. The computer-implemented method of claim 1, wherein each image of the plurality of images has a unique image address.

4. The computer-implemented method of claim 1, wherein the selectable object has a unique identification.

5. The computer-implemented method of claim 1, wherein at least one image of the plurality of images is a virtual reality shot.

6. The computer-implemented method of claim 1, wherein at least one image of the plurality of images is a video frame.

7. The computer-implemented method of claim 1, wherein the selectable object is indexed by an area that the selectable object occupies in an image containing the selectable object.

8. The computer-implemented method of claim 7, wherein the user selects the selectable object by clicking within the area that the selectable object occupies.

9. The computer-implemented method of claim 1, further comprising:
   receiving from the user a selection of the selectable object within the virtual reality scene;
   displaying an additional selectable object within the virtual reality scene, a second object of the plurality of first objects corresponding to the additional selectable object;
   receiving from the user an additional selection of the additional selectable object within the virtual reality scene;
   wherein the submission mechanism further allows the user to at least one of order and buy the second object of the plurality of first objects, the step of displaying the link to the submission mechanism is performed after the step of receiving from the user the additional selection, and the selectable object is built from a plurality of images of the one of the plurality of first objects taken from different angles.

10. A computer-implemented method, comprising:
- displaying a virtual reality scene corresponding to a physical scene including a plurality of first objects, wherein the virtual reality scene is built from a plurality of images representing different views of the physical scene;
- enabling a user to navigate within the virtual reality scene and observe the virtual reality scene from one or more perspectives of the different views;
- displaying a selectable object within the virtual reality scene, the selectable object corresponding to one object of the first objects, wherein the selectable object is built from a plurality of images of the one object taken from different respective angles;
- upon receiving a selection of the selectable object, displaying the one object in a rotational view window, and enabling the user to observe the one object from a plurality of angles; and
- receiving a selection of the selectable object within the rotational view window, and displaying additional information related to the selectable object, wherein the additional information includes at least one of: a link to buy the one object and a link to bid on the one object.

11. The computer-implemented method of claim 10, further comprising:
- displaying in the rotational view window command buttons operable to enable the user to scroll left, right, up, and down, and zoom-in and zoom-out within one of the plurality of images of the one object.

12. The computer-implemented method of claim 10, wherein the physical scene corresponds to one of: a showroom, a gallery, a store, a mall, and an auction site.

13. The computer-implemented method of claim 10, wherein each image has a unique image address.

14. The computer-implemented method of claim 10, wherein the selectable object has a unique identification.

15. The computer-implemented method of claim 10, wherein at least one of the plurality of images of the one object is selected from the group consisting of: a virtual reality shot and a video frame.

16. The computer-implemented method of claim 10, wherein the selectable object is indexed by an area that the selectable object occupies in an image containing the selectable object.

17. The computer-implemented method of claim 16, wherein the user selects the selectable object by clicking within the area that the selectable object occupies.

18. A computer-implemented method, comprising:
- displaying a virtual reality scene corresponding to a physical scene including a plurality of first objects, wherein the virtual reality scene is built from a plurality of images representing different views of the physical scene;
- enabling a user to navigate within the virtual reality scene and observe the virtual reality scene from one or more perspectives of the different views;
- displaying two or more selectable objects within the virtual reality scene, the two or more selectable objects comprising a first selectable object and a second selectable object, one first object of the plurality of first objects corresponding to the first selectable object, a second first object of the plurality of first objects corresponding to the second selectable object, wherein the first selectable object is built from a plurality of images of the one first object, and the second selectable object is built from a plurality of images of the second first object;
- receiving a selection of at least the first and second selectable objects during a virtual reality presentation;
- storing the selection, wherein the stored selection includes links to additional information regarding the first and second selectable objects;
- in response to receiving the selection, displaying the one first object and the second first object in a rotational view window, and enabling the user to observe the one first object and the second first object from a plurality of angles; and
- after receiving the selection, displaying a link to an actionable commerce application comprising a submission mechanism that allows the user to bid on the one first object and the second first object.

19. The computer-implemented method of claim 18, wherein the additional information related to the first and second selectable objects is retrieved and stored when the user selects a submit button.

20. The computer-implemented method of claim 18, wherein the additional information further includes at least one of:
- a plurality of graphical images of one of the first objects, an enlarged still image of one of the first objects, a photograph of one of the first objects, a virtual reality presentation of one of the first objects, a video of one of the first objects, an audio description of one of the first objects, and a textual description of one of the first objects.

21. The computer-implemented method of claim 18, wherein the physical scene corresponds to one of: a showroom, a gallery, a store, a mall, and an auction site.

22. The computer-implemented method of claim 18, wherein each image has a unique image address.

23. The computer-implemented method of claim 18, wherein each selectable object has a unique identification.

24. The computer-implemented method of claim 18, wherein at least one of the plurality of images is selected from the group consisting of: a virtual reality shot and a video frame.

25. The computer-implemented method of claim 18, wherein the first selectable object is indexed by an area that the first selectable object occupies in an image containing the first selectable object.

26. The computer-implemented method of claim 25, wherein the user selects the first selectable object by clicking within the area that the first selectable object occupies.

* * * * *